(12) United States Patent
Muto et al.

(10) Patent No.: US 6,762,685 B2
(45) Date of Patent: Jul. 13, 2004

(54) WRIST PORTABLE INFORMATION APPARATUS AND SPEECH METHOD

(75) Inventors: Atsushi Muto, Chiba (JP); Noboru Kawai, Chiba (JP)

(73) Assignee: Seiko Instruments Inc., Chiba (JP)

( * ) Notice: Subject to any disclaimer, the term of this patent is extended or adjusted under 35 U.S.C. 154(b) by 197 days.

(21) Appl. No.: 10/005,033

(22) Filed: Dec. 4, 2001

(65) Prior Publication Data

US 2002/0097158 A1 Jul. 25, 2002

(30) Foreign Application Priority Data

Dec. 26, 2000 (JP) .......................... 2000-395258
Oct. 18, 2001 (JP) .......................... 2001-320669

(51) Int. Cl.[7] .............................. G08B 23/00
(52) U.S. Cl. .............................. 340/573.1; 340/539.1; 340/384.1; 368/13; 455/575.6; 379/430
(58) Field of Search .......................... 340/573.1, 539.1, 340/384.1; 368/10, 13, 72; 455/315, 567, 575.7, 575.6; 379/430, 433.01

(56) References Cited

U.S. PATENT DOCUMENTS 4,847,818 A * 7/1989 Olsen .......................... 368/10
5,050,138 A * 9/1991 Yamada et al. ............... 368/10
5,134,418 A   7/1992 Gomez et al. ............... 343/718
5,861,797 A * 1/1999 Becker ...................... 340/309.3

FOREIGN PATENT DOCUMENTS

EP      0366875       5/1990
EP      0681391      11/1995

* cited by examiner

Primary Examiner—Anh V. La
(74) Attorney, Agent, or Firm—Adams & Wilks

(57) ABSTRACT

A wrist portable information apparatus has a case containing a circuit board having a wireless communication circuit for performing wireless communication and a voice processing circuit for performing voice processing. First and second straps are connected to the case to mount the case to a user's wrist. A speaker is disposed in one of the case and the first strap to output processed voice from the voice processing circuit, and a microphone is disposed in one of the case and the second strap to input voice to the voice processing circuit. A contact mechanism is provided with an electrically connected state which is changed in response to opening and closing of at least one of the first strap and the second strap. A detecting circuit detects opening and closing of the first strap or the second strap by detecting the connected state of the contact mechanism.

30 Claims, 17 Drawing Sheets

WRIST PORTABLE INFORMATION APPARATUS AND SPEECH METHOD

BACKGROUND OF THE INVENTION

1. Field of the Invention

The present invention relates to a wrist portable information apparatus

2. Description of the Prior Art

As a first type of a conventional wrist portable information apparatus, there are Japanese Patent Laid-Open No. 177663/1999 and Japanese Utility Model No. 3059555 and there is a known type of wrist portable information apparatus in which conversation is made after detaching the watch from the user's wrist. According to such a wrist portable information apparatus, a microphone and a speaker integrated into the strap are connected to a main body by wire. Therefore, as shown by FIG. 16 and FIG. 17, regardless of states of opening and closing the strap, the microphone and the speaker are always connected to a circuit block (or circuit board) of the main body.

Further, as a second example of the conventional wrist portable information apparatus, there is provided Japanese Patent Laid-Open No. 307682/1995. According to the second conventional example, although a microphone and a speaker are connected to a main body by wire similar to the first conventional example, as shown by FIG. 18 and FIG. 19, the speaker is separate from the main body and a strap and is separated from the main body via a hinge. The speaker of the second conventional example is contained in a containing portion provided at the main body when speech is not made and is detached from the containing portion when speech is made. FIG. 20 shows a method of making speech according to the second conventional example. It is necessary that the main body stays mounted to the wrist by closing the strap and speech is made by moving the hinge portion and enveloping the speaker by the palm over the ear.

Further, according to a third example of the conventional wrist portable information apparatus, as general means for providing an alarm, there are known means utilizing sound such as a buzzer or by vibration by a motor. Further, as a method of switching the informing means, there is known a wrist portable information apparatus in which a user arbitrarily selects the type of alarm means.

Further, similar to the wrist portable information apparatus, in a portable telephone having a function of vibration rather than sound for an alarm, as a fourth example, there is known a portable telephone for storing an operable time for use of a vibration generating means set by time setting means and for informing of an incoming call by vibration only based on a predetermined time range as disclosed in Japanese Patent Laid-Open No. 19965791/1996 and as a fifth conventional example, there is known a portable telephone for detecting surrounding noise and informing the user of an incoming call by vibration when the detected surrounding noise is larger than a previously set reference level or smaller than the reference level, as disclosed in Japanese Patent Laid-Open No. 251259/1996.

According to the first conventional example, in addition to the motion of opening the strap and detaching the main body from the wrist from a state of closing the strap and mounting the main body to the wrist and thereafter putting the wrist portable information apparatus to the ear, some operation of pushing a button is needed, which is troublesome for a user. Further, according to the second conventional example, although the second conventional example is not troubled by button operation as in the first conventional example, speech style differs from a style of supporting the wrist portable information apparatus by the hand and putting the apparatus to the ear as in the wrist portable information apparatus which the user is accustomed to by a hand set of a normal telephone or a portable telephone. According to the second embodiment, although the apparatus is easy to put to the ear on a side the same as that of the hand wearing the telephone, the apparatus is difficult to put to the other ear. Further, the speech style is liable to feel strange to the user and is similar to a hand gesture associated with thinking and accordingly, it can be anlogically interpreted easily that the gesture is liable to be mistaken by surrounding persons.

Further, conventionally, sound-based informing means create a problem in that when a terminal is brought into close contact with the body as in the wrist portable apparatus, sound is absorbed by the body and the sound pressure level is lowered and therefore, information is difficult to hear. Further, there is a problem in that a user hardly hears information by sound at a location where the surrounding environment is noisy. Conversely in a music hall the surrounding of which is quiet, in meeting, or in a train, information sound based alarms pose a problem in view of the disruptive and rude environment they create.

Meanwhile, in informing means based on vibration, when the terminal is brought into close contact with the body as in the wrist portable apparatus, vibration is propagated directly to the body, and therefore, in comparison with sound-based informing means, the informing means is difficult to undergo influence of noise or the like. Further, there is achieved an advantage of being capable of transmitting information without bothering others even at a location where information by sound poses a problem. However, although the informing means by vibration is effective informing means when the informing means is mounted to the body, when the informing means is detached and left remotely from the body or when the informing means is put in a bag or the like, there poses a problem that vibration cannot be sensed.

In order to resolve the above-described problem, there is known a wrist portable information apparatus having both informing means for informing by sound and informing by vibration and used by switching the informing means depending on time and occasion.

However, when informing by sound and informing by vibration are switched manually as in the third conventional example, it is troublesome to change the setting. Further, when the user forgets to switch the informing means inadvertently and carries the wrist portable information apparatus to a location where information by sound poses a problem in view of manner while setting the informing means to informing by sound, surrounding persons are troubled thereby. Further, when the wrist portable information apparatus is detached from the arm while setting the apparatus to informing by vibration, there is a concern that vibration cannot be sensed.

Further, when informing means is automatically changed by time range as in the fourth conventional example, although the wrist portable information apparatus is effective to some degree during a user's regular routine daily routine, the apparatus becomes inconvenient when the user's routine is deviated, or when the user intends to change the informing means according, to location.

Further, when the informing means is automatically changed by surrounding noise as in the fifth conventional example, at a quiet location, the informing means automatically carries out informing by sound. In this case, at a location where when the surrounding is a quiet environment as in a music hall, mentioned above, and informing by sound troubles surrounding persons, the information switching means may conversely becomes inconvenient. As described above, manual change of the informing means is operationally troublesome. However, conventionally, there has not been found effective means for automatically changing to set the informing means.

SUMMARY OF THE INVENTION

Hence, the invention has been carried out in order to resolve such a problem and it is an object thereof to provide a wrist portable information apparatus promoting operability.

In order to achieve the above-described object, according to the invention, there is provided a wrist portable information apparatus comprising a main body case mounted to a wrist, a strap connected to the main body case for mounting the main body case to the wrist, a contact mechanism an electrically connected state of which is changed by states of opening and closing the strap, a detecting circuit for detecting the states of opening and closing the strap from connected states of the contact mechanism, first informing means for informing in accordance with a request when the state of opening the strap is detected by the detecting circuit, and second informing means different from the first informing means for informing in accordance with the request when the state of closing the strap is detected by the detecting circuit.

According to the invention, there is provided the wrist portable information apparatus, characterized in further comprising at an inner portion of the main body case a time counting circuit for counting time, and a memory circuit for storing arbitrarily set time information, wherein the informing is carried out when the set time information stored in the memory circuit and the time counted by the time counting circuit coincide with each other.

According to the invention, there is provided the wrist portable information apparatus, further comprising a wireless circuit for carrying out wireless communication at the inner portion of the main body case, wherein the informing is carried out when data is received from outside via the wireless circuit.

According to the invention, there is provided the wrist portable information apparatus, further comprising a voice generating circuit for uttering sound and a vibration generating circuit for vibrating a vibration motor at the inner portion of the main body case, wherein the first informing means is informing means by sound and the second informing means is informing means by vibration.

According to the invention, there is provided a wrist portable information apparatus comprising a wireless circuit for carrying out wireless communication, a main body case containing a circuit block having a voice circuit for carrying out a voice processing, a first strap connected to the main body case for mounting the main body case to a wrist, a second strap connected to the main body case and provided at a position opposed to the first strap, a speaker contained in the main body case or the first strap for outputting processed voice from the voice circuit, a microphone contained in the main body case or the second strap for inputting voice to the voice circuit, a contact mechanism an electrically connected state of which is changed by opening and closing states of the first strap or the second strap, and a detecting circuit for detecting the opening and closing states of the first strap or the second strap from connected states of the contact mechanism.

According to the invention, there is provided a wrist portable information apparatus comprising a main body case having a circuit block having a wireless circuit for carrying out wireless communication and a voice circuit for carrying out a voice processing, a first strap having a speaker for outputting processed voice from the voice circuit, a second strap having a microphone for inputting voice to the voice circuit and provided at a position opposed to the first strap, a first contact mechanism an electrically connected state of which is changed by opening and closing states of the first strap and the main body case, a second contact mechanism an electrically connected state of which is changed by opening and closing states of the second strap and the main body case, and a detecting circuit for detecting opened and closed states of the first strap and the second strap from connected states of the first contact mechanism and the second contact mechanism.

By the above-described structure, according to the wrist portable information apparatus of the present invention, informing by vibration is carried out when the wrist portable information apparatus is mounted to the wrist in the case of coincidence of alarm and in the case of receiving signal arrival of a telephone call and signal arrival of electronic mail from outside. Thereby, influence of the surrounding noise has little effect and firm informing can be carried out without bothering surrounding persons even at a location in which the surrounding is quiet.

Further, when the wrist portable information apparatus of the invention is detached from the wrist, informing by sound is carried out. Thereby, when informing by vibration is inconvenient, informing is carried out by auditory sense by sound to thereby enable to transmit informing more firmly.

Thereby, there can be provided a wrist portable information apparatus excellent in operability by automatically switching the informing means and capable of transmitting informing more firmly.

According to the invention, there is provided the wrist portable information apparatus, wherein the circuit block transmits a message to a counter party in a state in which either of the first strap and the second strap is opened. Thereby, during a constant period of time from a state of opening the strap until voice is inputted, a speech state in a soundless state can be transmitted to the counter party.

According to the invention, there is provided the wrist portable information apparatus, wherein the circuit block selects whether the message is to be transmitted by a state of opening either of the first strap and the second strap. Thereby, when the strap can be operated by the both hands and in the case of signal arrival in a state in which the strap is not worn by the arm, transmission of the message can be dispensed with.

According to the invention, there is provided the wrist portable information apparatus comprising: a main body case mounted to a wrist, a strap connected to the main body case to mount the main body case to the wrist, a contact mechanism an electrically connected state of which is changed by states of opening and closing the strap, a detecting circuit for detecting the states of opening and closing the strap from connected states of the contact mechanism, a first alarm to inform in accordance with a request when the state of opening the strap is detected by the detecting circuit, and a second alarm different from the first alarm to inform in accordance with the request when the state of closing the strap is detected by the detecting circuit.

According to the invention, there is provided the wrist portable information apparatus, further comprising: a voice generating circuit to utter sound and a vibration generating circuit to vibrate a vibration motor at the inner portion of the main body case, wherein the first alarm is informed by sound and the second alarm is informed by vibration. According to the invention, there is provided a speech method comprising a signal arriving step of informing that an arrived signal is received, and a speech step of being brought into a speech state when a strap is opened in a state of the signal arriving step. Thereby, when the strap is opened and detached from the wrist, the speech state can be produced without carrying out special operation.

According to the invention, there is provided the speech method, further comprising a nonspeech step of being brought into a nonspeech state when the strap is closed after opening the strap. Thereby, when the strap is closed and mounted to the wrist, the nonspeech state can be produced without carrying out special operation.

According to the invention, there is provided the speech method, further comprising a message transmitting step of transmitting a predetermined message to a counter party until voice is inputted from a microphone in the speech state. Thereby, even when the speech state is produced, the soundless state until voice is inputted from a microphone can be prevented.

According to the invention, there is provided the speech method, further comprising a selecting step of selecting whether the message transmitting step is to be carried out. Thereby, in a state in which the strap can be opened by the both hands as in the case in which, for example, the strap is detached from the wrist, speech can immediately be made with the counter party and therefore, the wrist portable information apparatus can be used in conformity with a situation of use.

According to the invention, there is provided the speech method, further comprising a message selecting step of being capable of selecting the message arbitrarily by a user. Thereby, a user can further accurately transmit a message suitable for the counter party or a state in which the user is left to the counter party.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

An explanation will be given of wrist portable information apparatus according to the invention in reference to the drawings as follows.

<First Embodiment According to the Invention>

Figure 1:
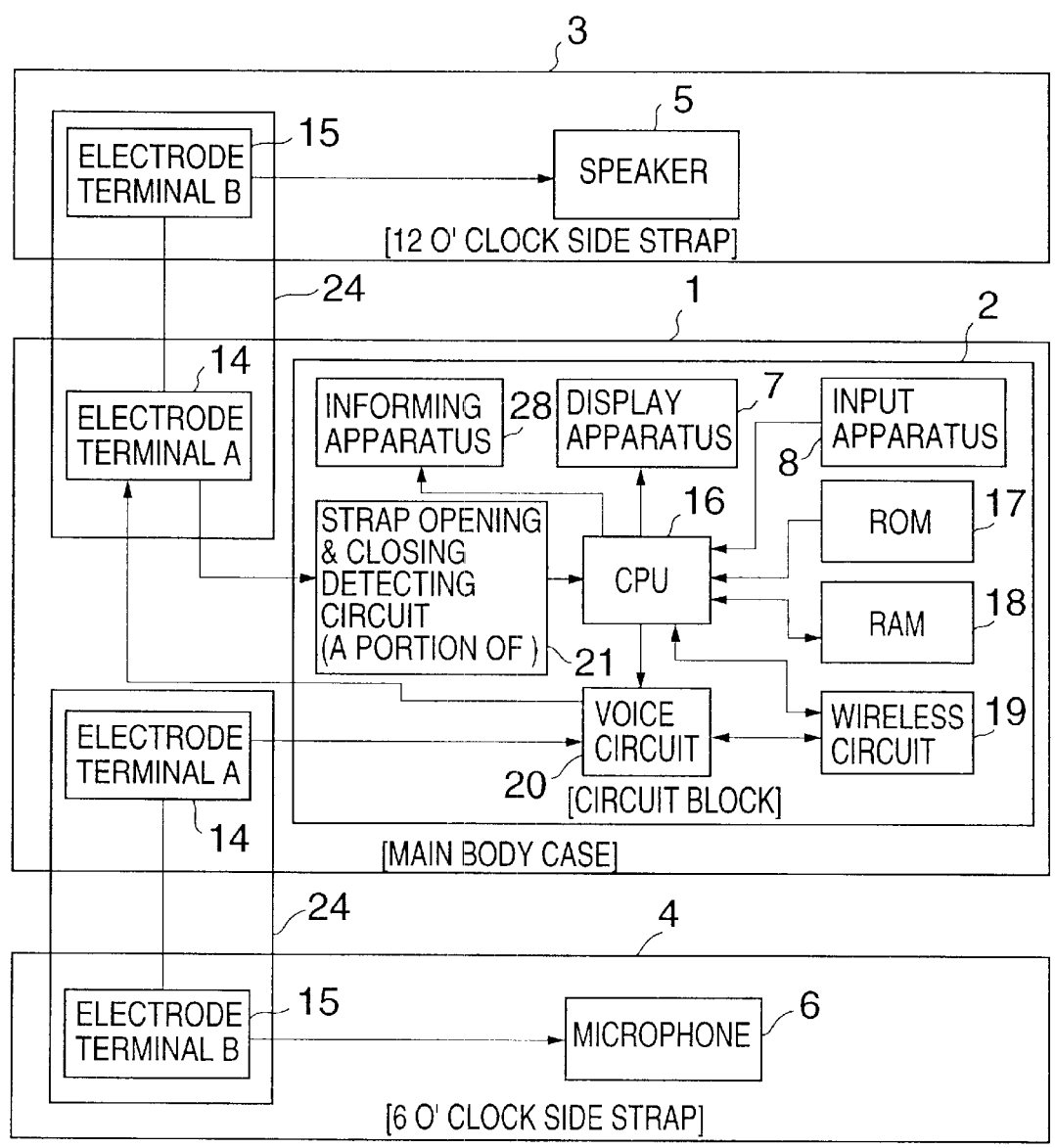
FIG. 1 is a block diagram showing a circuit constitution of a wrist portable information apparatus according to a first embodiment of the invention.

FIG. 1 is a block diagram showing a circuit constitution of a wrist portable information apparatus according to a first embodiment of the invention. Numeral 1 designates a main body case. The main body case 1 is attached with a 12 o'clock side strap 3 and a 6 o'clock side strap 4 and is used by being mounted to the wrist. The main body case 1 includes a circuit block 2 and an electrode terminal A14 constituting a portion of a contact mechanism 24.

The circuit block 2 is mounted with circuit parts on a printed board. The circuit block 2 is constituted by CPU 16, ROM 17, RAM 18, an input apparatus 8, a display device 7, a wireless circuit 19, a voice circuit 20, an informing apparatus 28 and a portion 21 of a strap opening and closing detecting circuit.

CPU 16 is connected with the wireless circuit 19 and a voice circuit 20 for voice speech by wireless. The wireless circuit 19 transmits and receives a digitized wireless signal. Arrival of the wireless signal is displayed on the display device 7 and is informed to a user by an informing apparatus 28 such as a vibration motor or LED. The voice circuit 20 converts digital data received by the wireless circuit 19 into an analog electric signal for outputting to a speaker 5, or Conversely converts an analog electric signal inputted from a microphone 6 into digital data and transmits the digital data to the wireless circuit 19. Further, CPU 16 is connected with the display device 7 for displaying data received by the wireless signal and displaying setting of the circuit block 2 and the input apparatus 8 for inputting a change in the setting of the circuit block 2 and instruction operation to CPU 16. An LCD panel of low power consumption is frequently used for the display device 7. A cross cursor is frequently used for the input apparatus 8 rather than push buttons for promoting operability and reducing a number of parts and, in recent times, the input apparatus 8 is frequently provided with a push button function for selection.

Further, the circuit block 2 is connected with ROM 17 and RAM 18 as memories. ROM 17 is stored with various programs for detecting wireless transmission and reception and opening and closing of the straps and setting inside of the circuit block 2 and data such as character fonts for displaying characters on the display device and voice signals. The programs stored in ROM 17 are executed on RAM 18.

Figure 2:
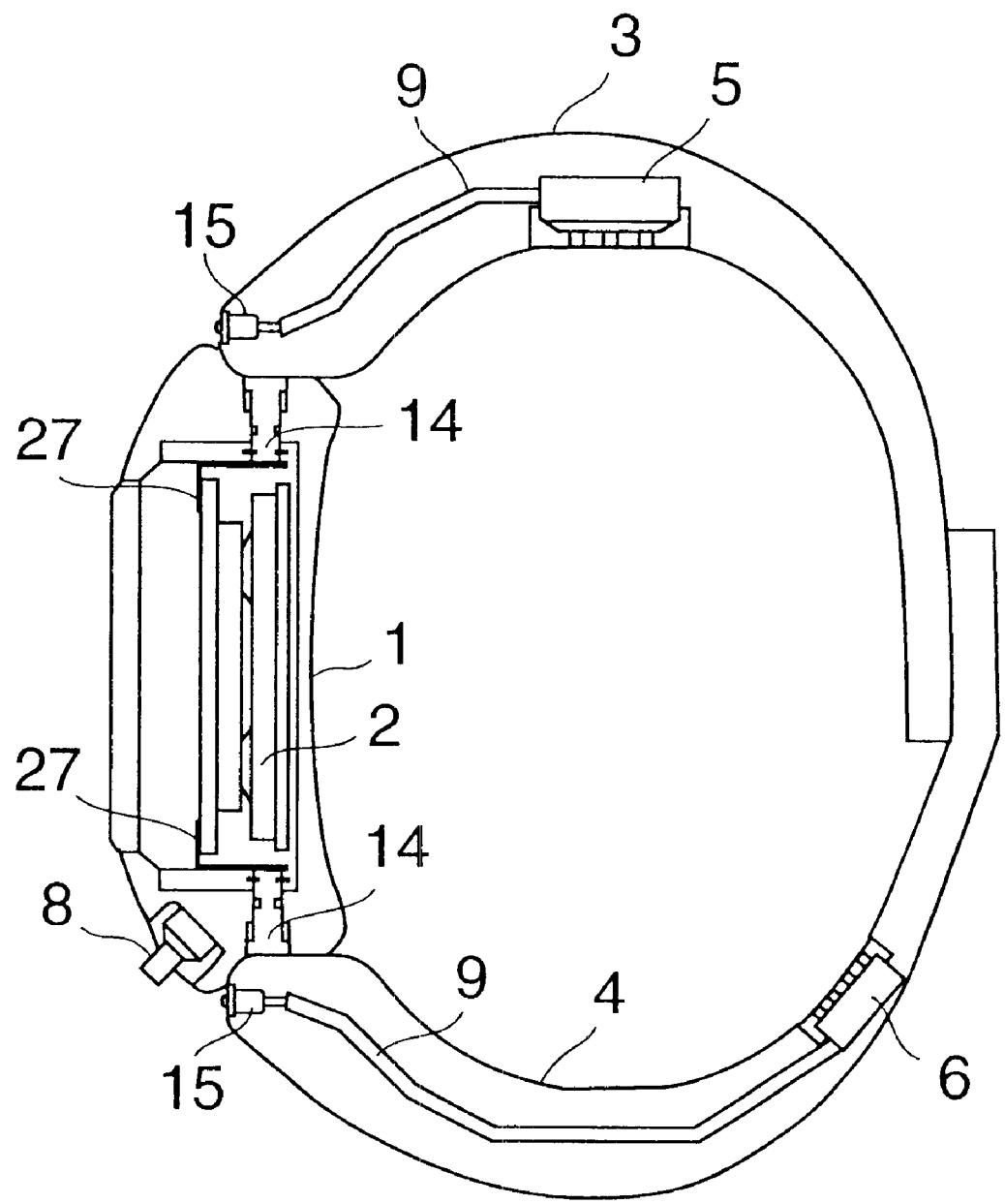
FIG. 2 is a perspective sectional view of a state in which a strap is closed and attached to the wrist in the wrist portable information apparatus of the first embodiment according to the invention.

The circuit block 2 is electrically connected to electrode terminals A respectively supported by the 12 o'clock side and the 6 o'clock side of the main body case 1 via contact springs 27 (FIG. 2).

The 12 o'clock side strap 3 is contained with the speaker 5 for voice speech. Similarly, the 6 o'clock side strap 4 is contained with the microphone 6. The speaker 5 and the microphone 6 are respectively connected electrically to the electrode terminals B15 respectively supported by the 12 o'lock side strap 3 and the 6 o'clock side strap 4 via lead wires 9.

Figure 3:
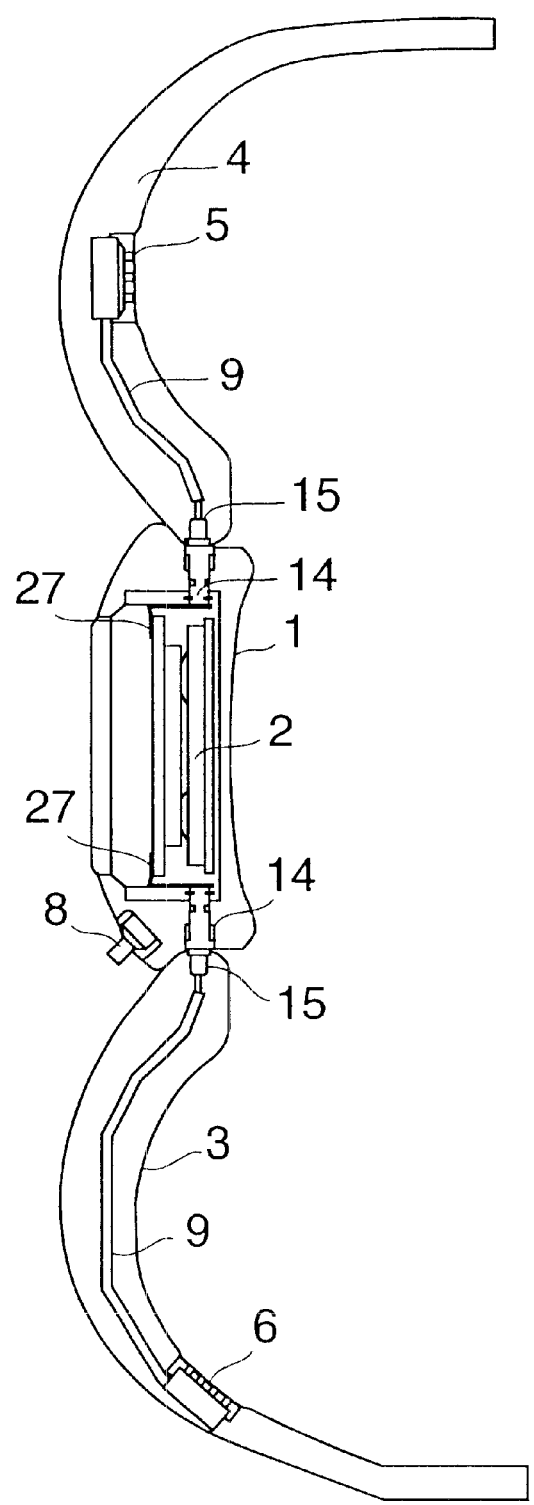
FIG. 3 is a perspective sectional view of a state in which the strap is opened and detached from the wrist in the wrist portable information apparatus of the first embodiment according to the invention.

FIG. 2 is a perspective sectional view of a state in which the straps of the wrist portable information apparatus are closed and attached to the wrist according to the first embodiment of the invention. FIG. 3 is a perspective sectional view of a state in which the straps of the wrist portable information apparatus are opened and detached from the wrist according to the first embodiment of the invention. A contact mechanism 24 of the wrist portable information apparatus according to the invention, is constituted by the electrode terminals A14 supported by the main body mechanism 1 and the electrode terminals B15 respectively supported by the 12 o'clock side strap 3 and the 6 o'clock side strap 4.

It is apparent from FIG. 2 that in the state of closing the straps, the electrode terminal B15 is directed in a direction orthogonal to the electrode terminal A14 and accordingly, the electrode terminal A14 and the electrode terminal B15 are not brought into contact with each other. Further, it is apparent from FIG. 3 that in the state of opening the straps, the direction of the electrode terminal B15 is changed to become in parallel with the electrode terminal A14 by opening the straps and accordingly, front end portions of the electrode terminal A14 and the electrode terminal B15 are brought into contact with each other.

In this way, by changing the direction of the electrode terminal B15 relative to that of the electrode terminal A14 by opening and closing the straps, the electrode terminal A14 and the electrode terminal B15 are brought into contact/noncontact states. As a result, conduction/nonconduction of electric signals with the circuit block 2 is realized in the microphone 6 and the speaker 5 electrically connected thereto by the lead wires 9 via the electrode terminals B15.

Figure 4:
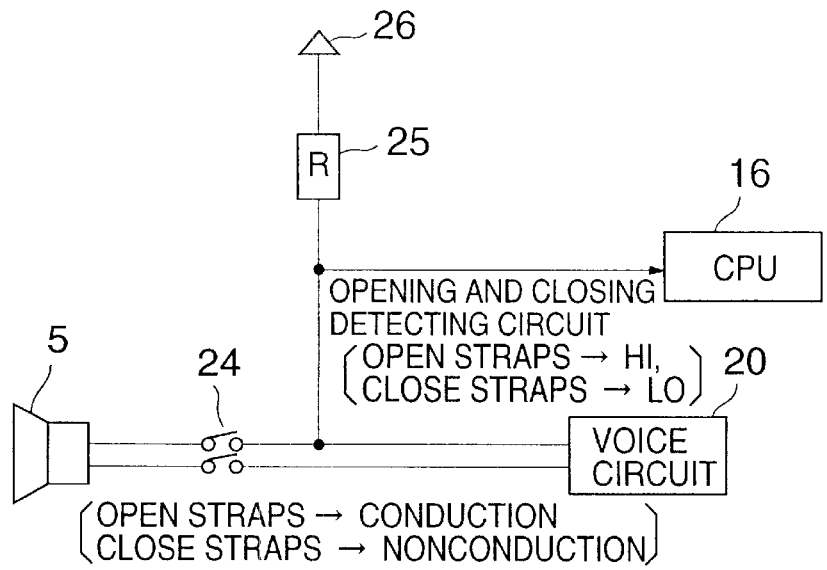
FIG. 4 is a block diagram showing a constitution example of a strap opening and closing detecting circuit in the wrist portable information apparatus of the first embodiment according to the invention.

In order to realize speech/nonspeech states by opening and closing the straps, it is necessary to detect opening and closing states of the straps by some method and inform the result to CPU 16. As an example, FIG. 4 shows an opening and closing detecting circuit of the first embodiment according to the invention.

The detecting circuit of the first embodiment according to the invention, is constituted by a pull-up resistor 25, the voice circuit 20 and the speaker 5 mounted on the circuit block 2. One side of the pull-up resistor 25 constitutes power source voltage. In the state of FIG. 2 in which the wrist portable information apparatus of the invention is mounted to the wrist and the straps are closed, the contact mechanism 24 is brought into a noncontact state and therefore, the speaker 5 and the circuit block 2 are brought into a nonconducted state and a state of being floated electrically. Therefore, in this state, the opening and closing detecting signal inputted to CPU 16 is provided with a potential the same as the power source voltage by the pull-up resistor 25. The state is logically defined as HI state.

Meanwhile, in the state of FIG. 3 in which the wrist portable information apparatus of the invention is detached from the wrist and the straps are opened, the contact mechanism 24 is brought into a contact state and the speaker 5 is brought into a conducted state with the circuit block 2 and is electrically connected thereto. Therefore, under the state, the opening and closing detecting signal inputted to CPU 16, is grounded to a potential substantially the same as GND potential via an impedance of the speaker 5. The state is logically defined as LO state.

In this way, according to the wrist portable information apparatus of the invention, the potential of the opening and closing detecting signal inputted to CPU 16, is logically changed to HI/LO by the opening and closing states of the contact mechanism 24. By utilizing the change, the wrist portable information apparatus of the invention detects opening and closing of the straps.

Figure 5:
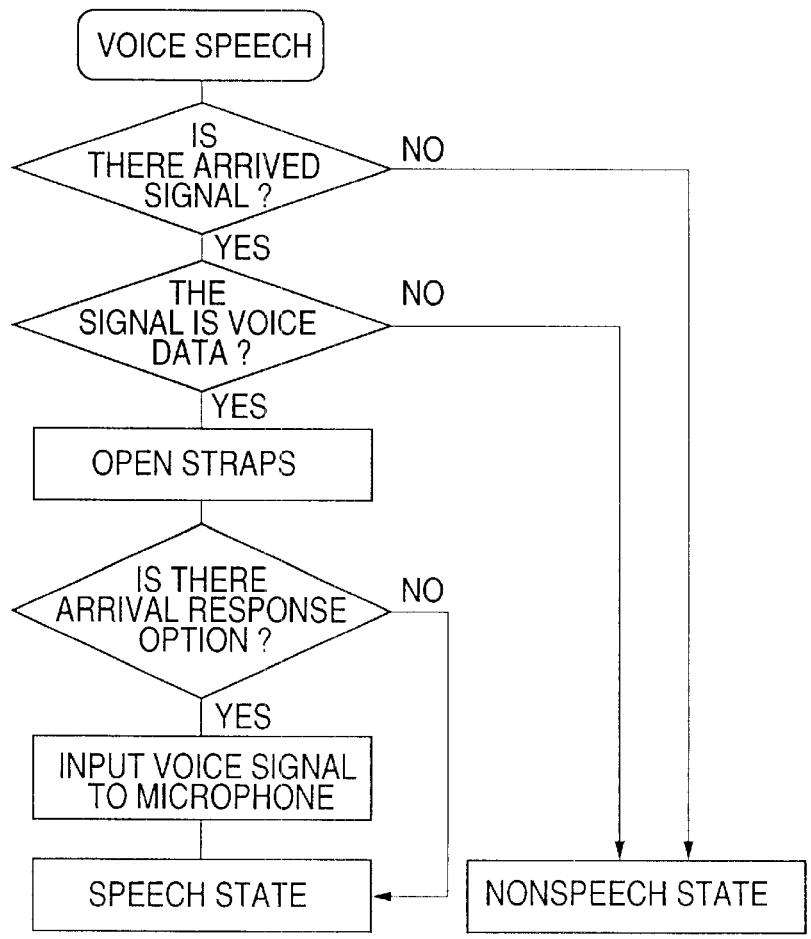
FIG. 5 is a flowchart diagram of a case in which the strap is opened to thereby constitute a speech state in the wrist portable information apparatus of the first embodiment according to the invention.

Next, an explanation will be given of voice speech using the wrist portable information apparatus of the invention in reference to a flowchart of FIG. 5. In a state in which the straps of the wrist portable information apparatus of the invention are closed and mounted to the wrist, when the wireless circuit 19 receives an arrived signal of wireless voice speech and the information is transmitted to CPU 16, the arrival of signal is informed to a user by vibration or light by the informing apparatus 28. Further, information of the arrived signal is displayed on the display device 7. At this occasion, when the arrived signal is a voice signal, the user opens the straps and detaches the wrist portable information apparatus from the wrist in order to start voice speech. At this occasion, the strap opening and closing detecting signal of the strap opening and closing detecting circuit, is changed from HI to LO and the state is transmitted to CPU 2. By opening the straps, the microphone 6 and the speaker 5 are electrically connected to the circuit block 2 and brought into a usable state.

Upon receiving that the strap opening and closing detecting signal of the strap opening and closing detecting circuit is changed from HI to LO, CPU 16 enables to start voice speech by shifting the wrist portable information apparatus to a speech state.

In this way, the wrist portable information apparatus of the invention enables to automatically shift to the speech state only by opening the straps and realizes more agreeable operability.

Further, according to the wrist portable information apparatus in which the straps are opened, the main body case 1, the 12 o'clock side strap 3 and the 6 o'clock side strap 4 are constituted to maintain a substantially linear attitude as shown by FIG. 3. Therefore, a user can handle the apparatus and makes speech in a sense quite similar to that of a portable telephone, PHS or a hand set of a wired telephone without having a strange feeling.

Supplementarily, when arrived information is nonvoice data such as data or the like or when there is not arrival of signal, even when the straps are opened, naturally, the apparatus does not shift to the speech state and stays in the nonspeech state.

When there is arrival of signal at the wrist portable information apparatus, from when the straps are detached therefrom to shift to the speech state, until the wrist portable information apparatus is put to the ear and voice is emitted to the microphone 6, it is conceivable that a soundless time period to some degree is caused although the time period is short. Hence, the wrist portable information apparatus of the invention is provided with arrival response option. This is a function of automatically transmitting a message stating that the user of the wrist portable information apparatus is preparing to speech, to a signal transmitting person during a time period until the voice signal is inputted to the microphone 6 when the apparatus does not shift to the speech state immediately after detaching the straps and the user emits voice by putting the wrist portable information apparatus to the ear to thereby produce a state of capable of making speech. The arrival response option can arbitrarily be selected and changed at any time by the user by setting a manu for customerizing the system of the wrist portable information apparatus. The information is held in RAM 18 by CPU 16.

A transmitted message of the arrival response option can be changed by forming an original message arbitrarily by a user and holding the message in RAM 18 other than a message of default previously prepared and held in ROM 17.

By using the arrival response option in accordance with desired situations, a user of the wrist portable information apparatus can correspond with the signal transmitting person carefully and considerately. Further, the user can arbitrarily select whether the speech state is brought about immediately or a message is transmitted in only certain situations and therefore, there can be provided a flexible speech style in accordance with different situations.

<Second Embodiment According to the Invention>

Figure 6:
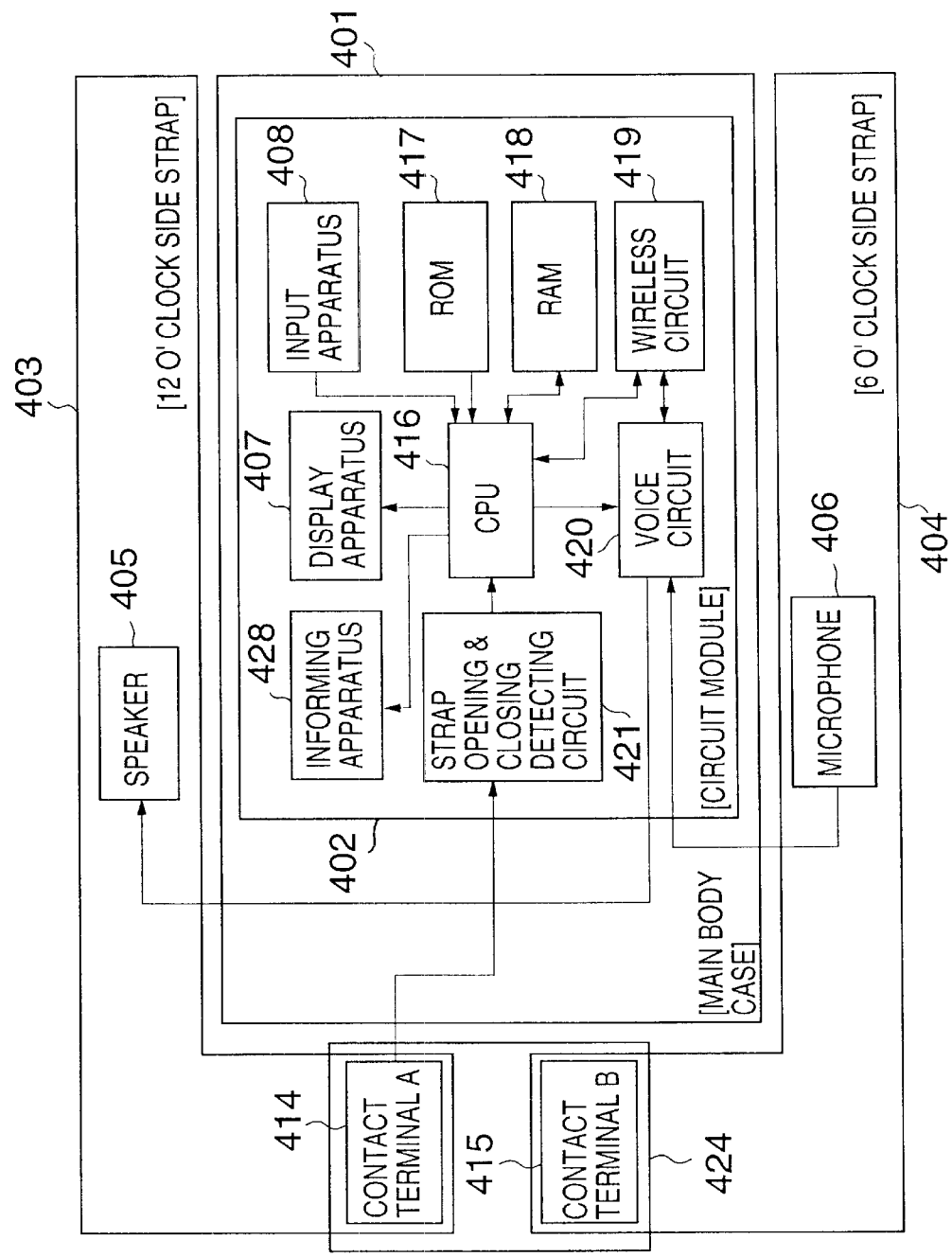
FIG. 6 is a block diagram showing a circuit constitution of a wrist portable information apparatus of a second embodiment according to the invention.

FIG. 6 is a block diagram showing a circuit constitution of a wrist portable information apparatus according to a second embodiment of the invention. A difference thereof from the first embodiment according to the invention of FIG. 1, resides in that a number of the contact mechanisms for changing the electrically connected state by opening and closing the straps, is two according to the first embodiment of FIG. 1, in contrast thereto, according to the second embodiment of FIG. 6, the number is one. Further, according to the first embodiment of FIG. 1, the speaker 5 and the microphone 6 are connected to the circuit block 2 via the contact mechanisms 24, in contrast thereto, according to the second embodiment of FIG. 6, a speaker 405 and a microphone 406 are connected to a circuit module 402 without interposing a contact mechanism 424.

Figure 7:
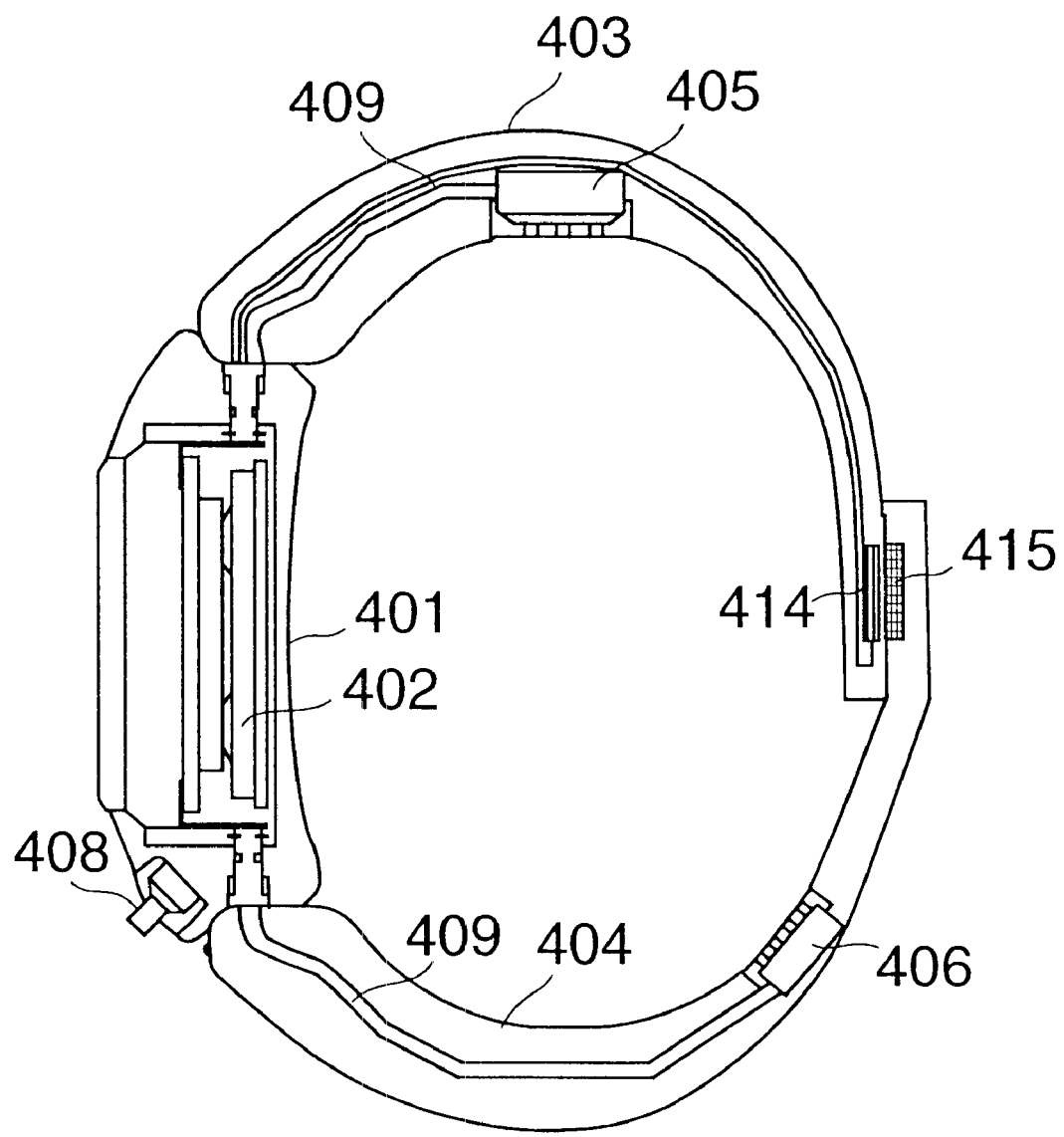
FIG. 7 is a perspective sectional view of a state in which a strap is closed and attached to the wrist in the wrist portable information apparatus of the second embodiment according to the invention.
Figure 8:
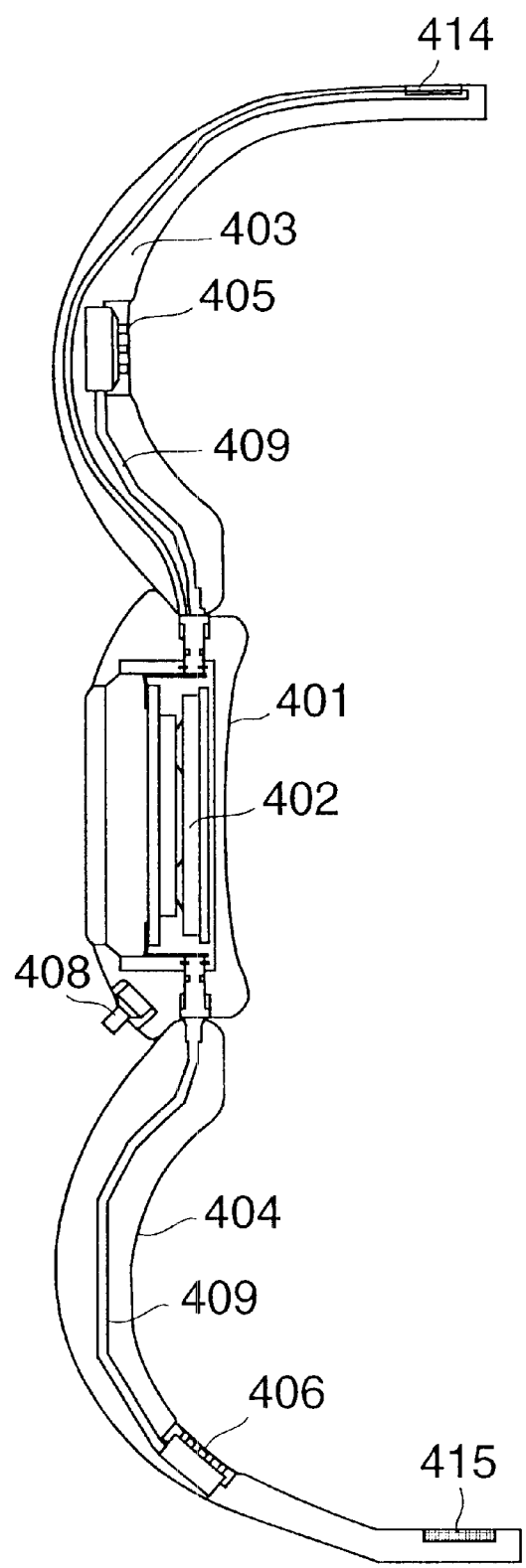
FIG. 8 is a perspective sectional view of a state in which the strap is opened and detached from the wrist in the wrist portable information apparatus of the second embodiment according to the invention.

FIG. 7 is a perspective sectional view of a state in which straps of the wrist portable information apparatus are closed and attached to the wrist according to the second embodiment of the invention. FIG. 8 is a perspective sectional view of a state in which the straps of the wrist portable information apparatus are opened and detached from the wrist according to the second embodiment of the invention. The contact mechanism 424 of the wrist portable information apparatus according to the invention, is constituted by a contact terminal A414 provided to a 12 o'clock side strap 403 and a contact terminal B415 provided at a 6 o'clock side strap 404.

In FIG. 7 and FIG. 8, there is shown an example of using a lead switch for the contact terminal A414 and a permanent magnet for the contact terminal B415 as an example of the contact mechanism 424. The lead switch is a switch having a mechanism of closing the contact by a magnetic field and therefore, in reference to FIG. 7, in a state of closing the straps, the permanent magnet of the contact terminal B415 becomes proximate to the lead switch of the contact terminal A414 and therefore, the switch is brought into a closed state. Conversely, in reference to FIG. 8, in a state of opening the straps, the permanent magnet of the contact terminal B415 becomes remote from the lead switch of the contact terminal A414 and therefore, the switch is brought into an opened state. In this way, the lead switch of the contact terminal A414 is changed to contact/noncontact states by opening and closing the straps.

Figure 9:
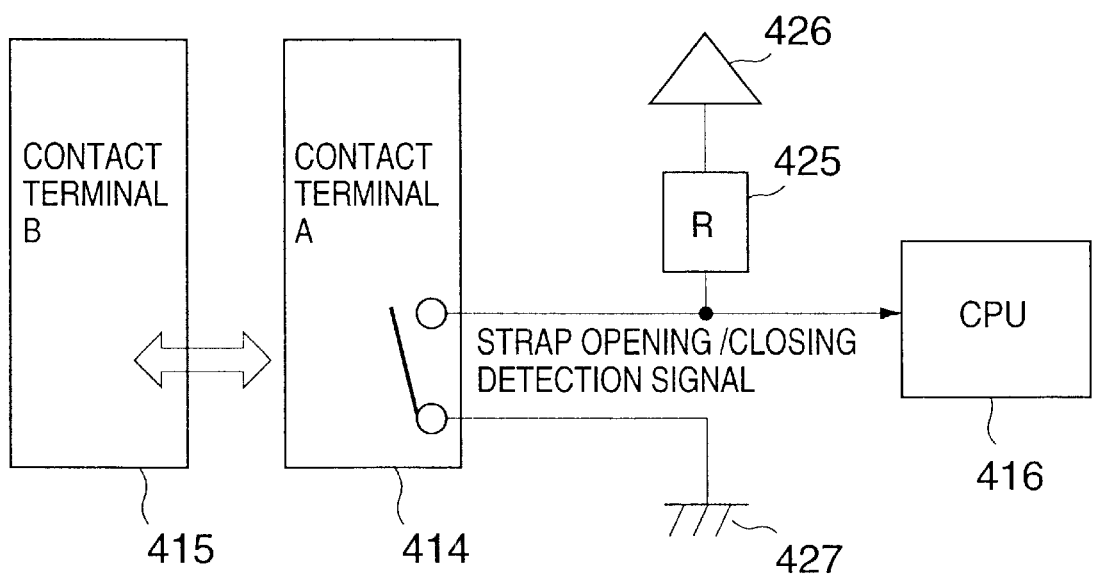
FIG. 9 is a circuit diagram for explaining detection of opening and closing the strap in the wrist portable information apparatus of the second embodiment according to the invention.

FIG. 9 is an electric circuit diagram for explaining detection of opening and closing the straps according to the second embodiment of the invention. In the state of FIG. 7 in which the wrist portable information apparatus according to the invention is mounted to the wrist and the straps are closed, the lead switch of the contact terminal A414 is brought into the closed state and accordingly, a conductive state is brought about. Therefore, a strap opening and closing detecting signal inputted to CPU 416 is grounded to a potential substantially the same as a GND potential 427. The state is logically defined as LO state. Meanwhile, in the state of FIG. 8 in which the wrist portable information apparatus according to the invention is detached from the wrist and the straps are opened, the lead switch of the contact terminal A414 is brought into the opened state and accordingly, a nonconductive state is brought about. Therefore, the strap opening and closing detecting signal inputted to CPU 416 is provided with a potential the same as that of power source voltage 426 by a pull-up resistor 425. The state is logically defined as HI state. In this way, according to the wrist portable information apparatus of the invention, the potential of the opening and closing detecting signal inputted to CPU 416 is logically changed to HI/LO by the states of opening and closing the straps. By utilizing the change, the wrist portable information apparatus according to the invention detects opening and closing of the straps.

By the above-described first embodiment and second embodiment according to the invention, it is known that opening and closing of the straps can be detected regardless of the number of the contact mechanisms for detecting opening and closing of the straps whether the number is one or two. Further, it is known that the microphone and the speaker may be connected to the circuit block via the contact mechanism or connected to the circuit block without interposing the contact mechanism. Further, the contact mechanism may be constructed by any constitution so far as the potential of the opening and closing detecting signal inputted to CPU 416 is logically changed to HI/LO by opening and closing the straps.

Further, although an explanation has been given of the examples in which the microphone and the speaker are arranged in the straps at this occasion, even when either or both of the microphone and the speaker are arranged in the main body case, a similar effect can be achieved.

<Third Embodiment According to the Invention>

Figure 10:
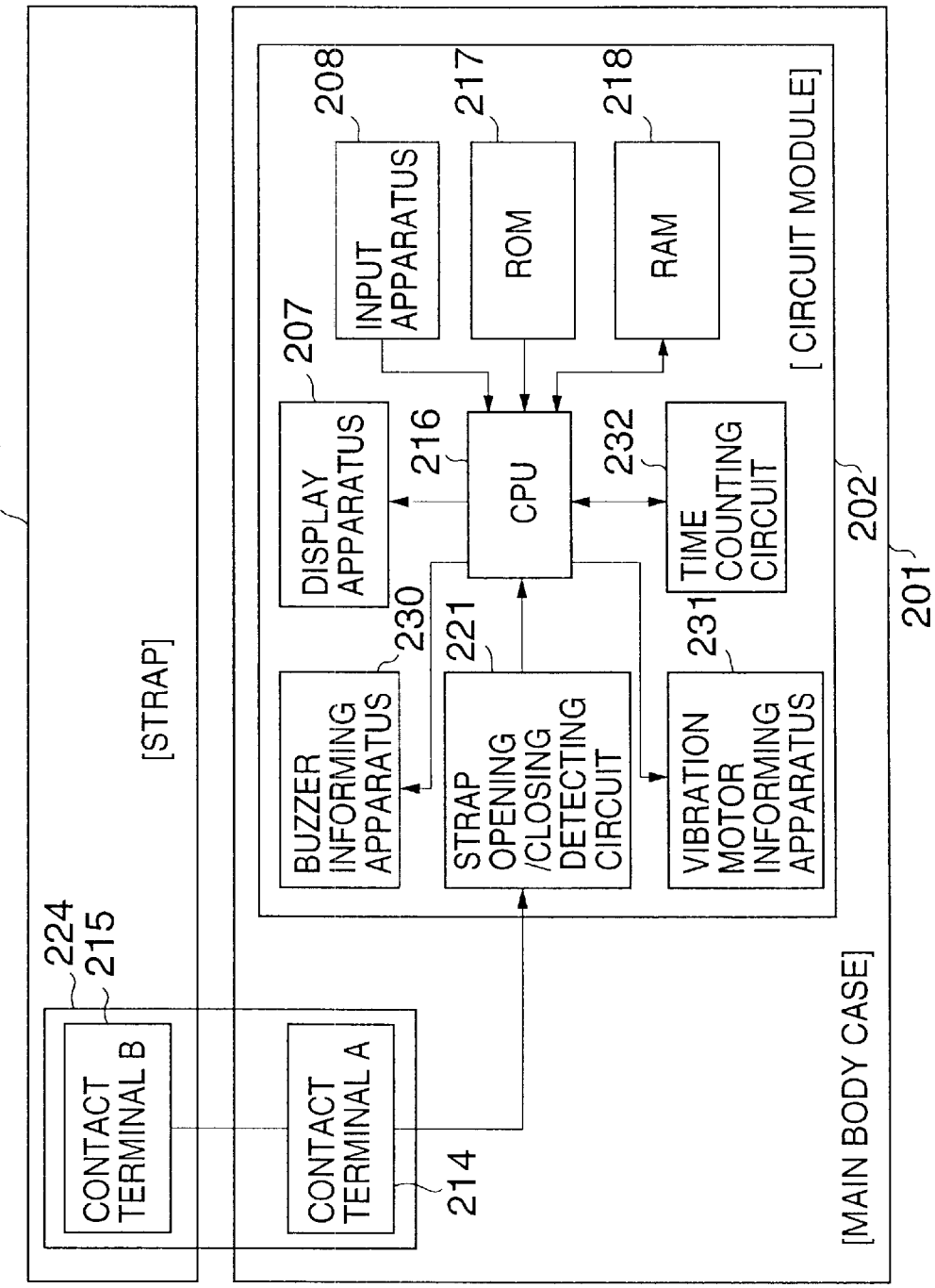
FIG. 10 is a block diagram showing a circuit constitution of a wrist portable information apparatus of a third embodiment according to the invention.

FIG. 10 is a block diagram showing a circuit constitution of a wrist portable information apparatus according to a third embodiment of the invention. A main body case 201 is attached with a strap 203 which is used by being mounted on the wrist. The main body case 201 is built with a circuit module 202 and a contact terminal A214 constituting a portion of a contact mechanism 224. The circuit module 202 is mounted with circuit parts on a printed board. The circuit module 202 is constituted by CPU 216, ROM 217, RAM 218, an input apparatus 208, a display apparatus 207, a buzzer informing apparatus 230, a vibration motor informing apparatus 231, a time counting circuit 232 and a strap opening and closing detecting circuit 221.

CPU 216 is connected with a time counting circuit 232. The time counting circuit 232 outputs a signal of 1 Hz by dividing a signal of 32.768 kHz oscillated by an inner quartz oscillator. CPU 216 adds a value of a time counter in RAM 218 by 1 at a period of the signal of 1 Hz outputted by the time counting circuit 232. The value of the time counter comprises values of second, minute, hour, day, month, year and the carrying processing is processed precisely by CPU 216. CPU 216 displays an added value of the time counter on RAM 216 at the display apparatus 207 by the signal period of 1 Hz. Thereby, time display of a timepiece can be carried out.

Further, the user can set arbitrary alarm time by the input apparatus 208. Values of hour and minute of the alarm time can be set and alarm is informed at time set once per day. Naturally, setting such as ON/OFF setting of the alarm can be set in accordance with convenience of the user. Various alarms are conceivable in accordance with its specification such as informing once per week, informing at designated day and hour and so on. The set alarm setting time is stored in RAM 218.

CPU 216 adds the time counter on RAM 218 at every period of 1 Hz outputted by the time counting circuit 232, compares the value of the time counter stored on RAM 218 with the alarm setting time and informs coincidence of alarm when the values are equal to each other.

CPU 216 is connected with the buzzer informing apparatus 230 for carrying out buzzer informing by controlling a buzzer and the vibration motor informing apparatus 231 for carrying out vibration information by controlling a vibration motor. The buzzer informing apparatus 230 makes the buzzer utter sound in accordance with an ON/OFF signal designated by CPU 216. The vibration motor informing apparatus 231 vibrates the vibration motor in accordance with the ON/OFF signal designated by CPU 216.

In the case of coincidence of alarm, CPU 216 makes the buzzer utter sound by outputting an utter signal of the buzzer to the buzzer informing apparatus 230 as first informing means to thereby inform a user by sound. Further, CPU 216 vibrates the vibration motor by outputting a vibration signal of the vibration motor to the vibration motor informing apparatus 231 as second informing means to thereby inform the user by vibration. ROM 217 is stored with information of a signal pattern of an ON/OFF control signal of the buzzer and the vibration motor and buzzer uttering time and vibration time of the vibration motor and the information can arbitrarily be set previously.

Further, when informing coincidence of alarm, there can be carried out pop-up display indicating coincidence of alarm on the display apparatus 207. Further, by adding an LED informing apparatus for lighting LED, in coincidence of alarm, LED can be displayed by winking simultaneously.

The CPU 216 is connected with the display apparatus 207 for displaying alarm setting information, alarm coincidence information, or setting of the circuit module 202 and the input apparatus 208 for inputting a change in the setting of the circuit module 202 and alarm setting instructing operation to CPU 216. As the display apparatus 207, an LCD panel of low power consumption is frequently used. In the input apparatus 208, a cross cursor type input device is frequently used rather than push buttons for enhancing operability and reducing the number of parts and, in recent times, the cross cursor has frequently been provided with a push button function for selection.

Further, the circuit module 202 is connected with ROM 217 and RAM 218 as memories. Various programs and the display apparatus 207 are stored with character fonts for displaying characters and data such as the buzzer uttering signal and the vibration motor vibrating signal.

The buzzer informing apparatus 230 is built with the buzzer for buzzer informing. Further, the vibration informing apparatus 231 is built with the vibration motor for vibration informing. Although a piezoelectric buzzer is generally used as a buzzer for a wrist watch, in recent times, there has been used a small-sized speaker to be able to reproduce more real and higher grade alarm sound by using a PCM sound source or an FM sound source. The vibration motor is devised to be able to pertinently transmit vibration to outside by being arranged to be brought into direct contact with the main body case or a case back.

Further, the main body case 201 is installed with the contact terminal A214 and the strap 203 is installed with the contact terminal B215. The contact terminal A214 is electrically connected to the circuit module 1. In a state in which the strap 203 is mounted to the wrist, the contact terminal A214 is brought into a state of being separated from the contact terminal B215 and a state of not being connected thereto electrically. Conversely, in a state of opening the strap 203, the contact terminal A214 and the contact terminal B215 are changed to a connected state. By monitoring the change of the electrically connected state, the strap opening and closing detecting circuit 221 can detect an opened or closed state of the strap.

By the above-described constitution, in the case of coincidence of alarm, CPU 216 firstly detects the opened or closed state of the strap by the strap opening and closing detecting circuit 221. Further, when the state in which the strap 203 is mounted to the wrist is detected, a vibration motor control signal is outputted to the vibration motor informing apparatus 231 to thereby carry out vibration informing by the vibration motor. Further, when the state in which the strap 203 is opened is detected, the buzzer control signal is outputted to the buzzer informing apparatus 230 to thereby carry out sound informing by buzzer.

Figure 11:
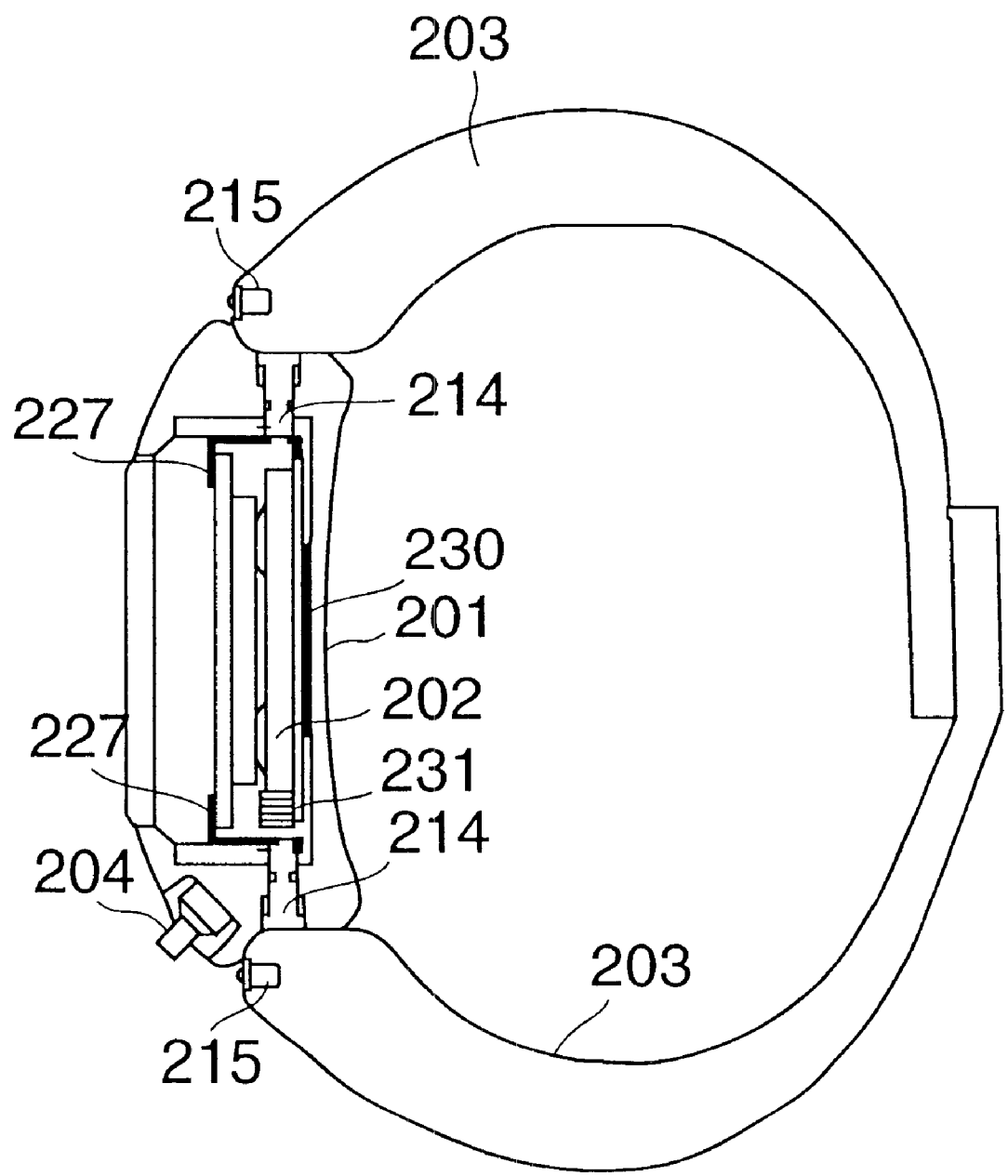
FIG. 11 is a perspective sectional view of a state in which a strap is closed and attached to the wrist in the wrist portable information apparatus of the third embodiment according to the invention.
Figure 12:
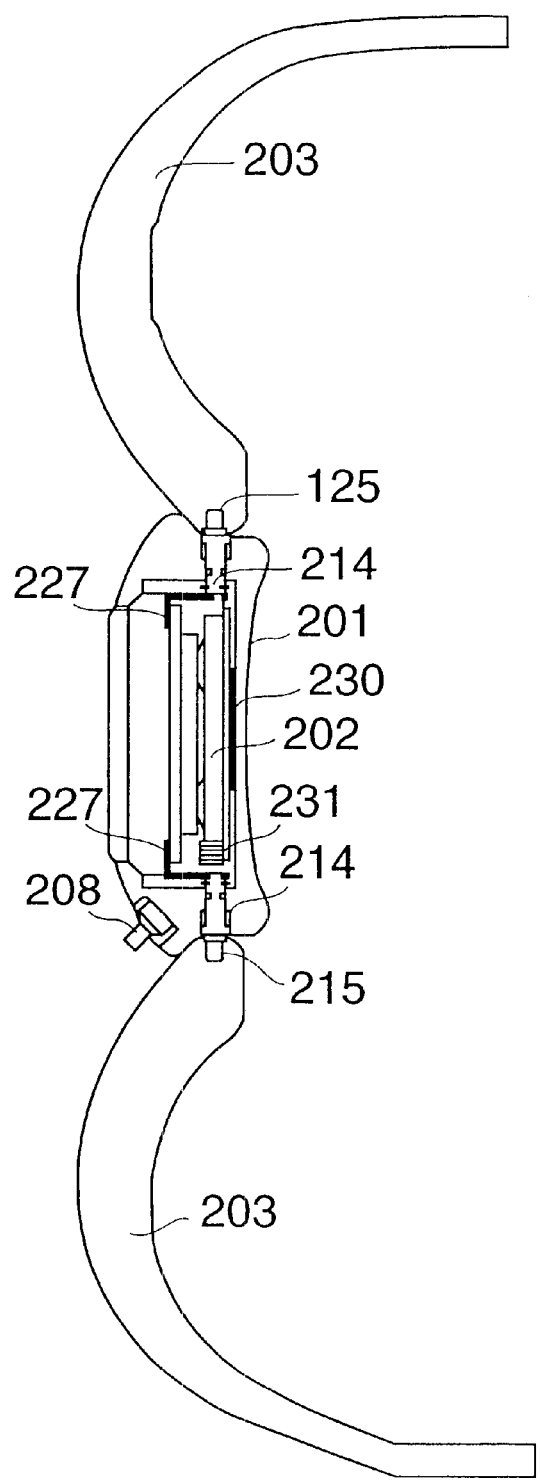
FIG. 12 is a perspective sectional view of a state in which the strap is opened and detached from the wrist in the wrist portable information apparatus of the third embodiment according to the invention.

FIG. 11 is a perspective sectional view of a state in which the strap of the wrist portable information apparatus according to the third embodiment of the invention, is closed and attached to the wrist. FIG. 12 is a perspective sectional view of a state in which the strap of the wrist portable information apparatus according to the third embodiment of the invention, is opened and detached from the wrist.

It is known by FIG. 11 that in the state of closing the strap 203, the contact terminal B215 is directed in a direction orthogonal to the contact terminal A214 and therefore, the contact terminal A214 and the contact terminal B215 are not brought into contact with each other. Further, it is known from FIG. 12 that in the state of opening the strap 203, the direction of the contact terminal B215 is changed to be in parallel with the contact terminal A214 by opening the strap 203 and accordingly, front end portions of the contact terminal A214 and the contact terminal B215 are brought into contact with each other.

In this way, by changing the direction of the contact terminal B215 relative to the contact terminal A214 by opening and closing the strap 203, the contact terminal A214 and the contact terminal B215 are brought into contact/noncontact states. As a result, the contact terminal A214 and the contact terminal B215 are brought into electrically connected/nonconnected states with the circuit module 202 via a contact spring 227.

Figure 13:
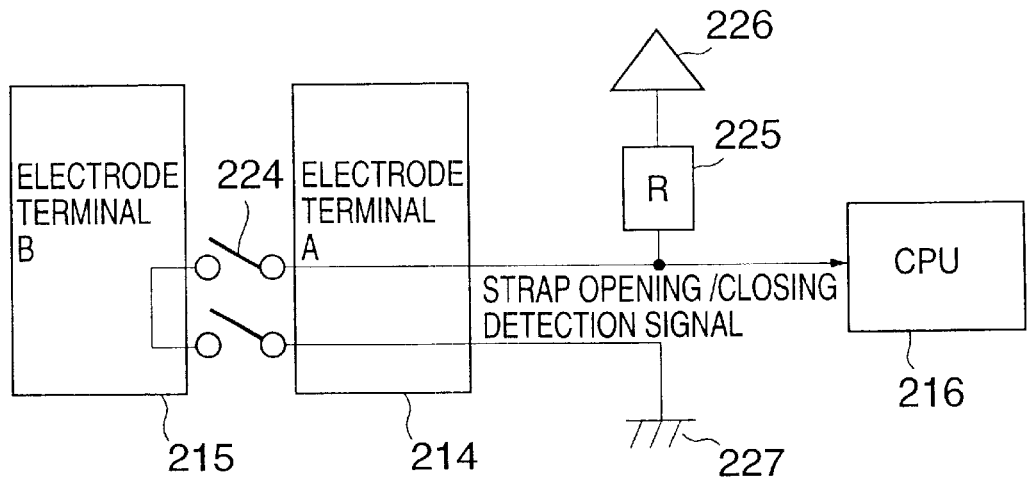
FIG. 13 is a circuit diagram for explaining detection of opening and closing the strap in the wrist portable information apparatus of the third embodiment according to the invention.

FIG. 13 is an electric circuit diagram for explaining strap opening and closing detection according to the third embodiment of the invention. In the state of FIG. 11 in which the wrist portable information apparatus of the invention is mounted to the wrist and the strap is closed, the contact terminal A214 on the side of the main body case and the contact terminal B215 on the side of the strap are brought into the noncontact state and therefore, the terminal mechanism 216 is brought into a nonconducted state. Therefore, the strap opening and closing detecting signal inputted to CPU 216 is provided with a potential the same as that of power source voltage 226 by a pull-up resistor 225. The state is logically defined as HI state. Meanwhile, in the state of FIG. 12 in which the wrist portable information apparatus according to the invention is detached from the wrist and the strap is opened, the contact terminal A214 on the side of the main body case and the contact terminal B215 on the side of the strap are brought into the contact state and therefore, the contact mechanism 216 is brought into a conducted state. Therefore, the strap opening and closing detecting signal inputted to CPU 216 is grounded to a potential substantially the same as GND potential 227. The state is logically defined as LO state.

In this way, according to the wrist portable information apparatus of the invention, the potential of the opening and closing detecting signal inputted to CPU 216 is logically changed to HI/LO by the opened and closed states of the contact mechanism 216. By utilizing the change, the wrist portable information apparatus of the invention detects opening and closing of the strap.

Figure 14:
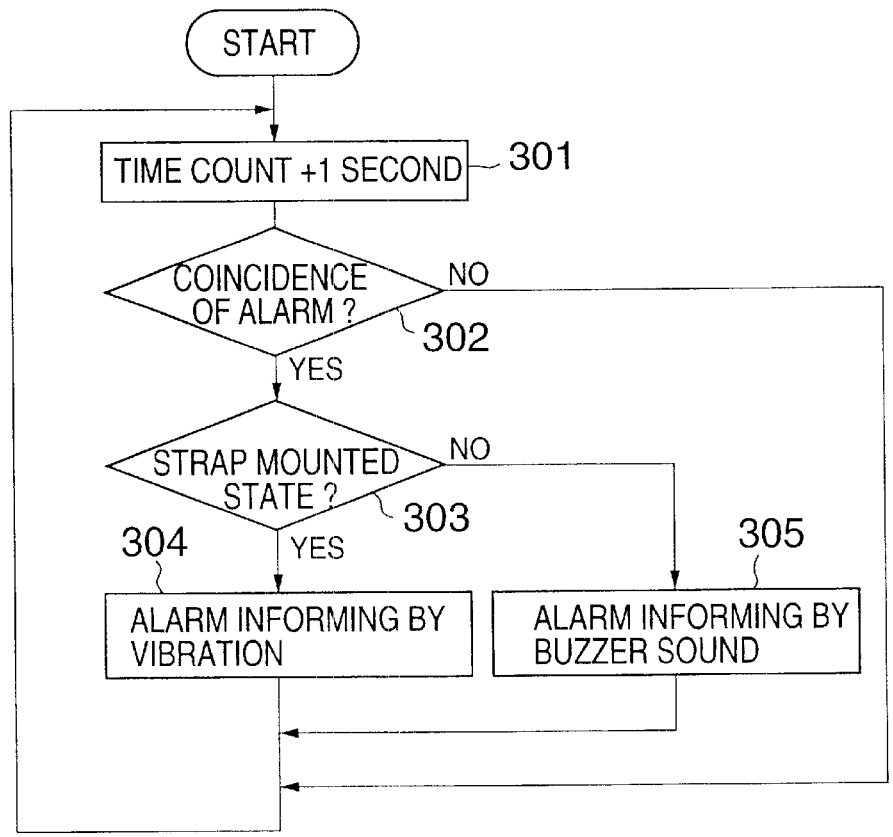
FIG. 14 is a flowchart diagram for explaining operation in coincidence of alarm in the wrist portable information apparatus of the third embodiment according to the invention.

FIG. 14 is a flowchart for explaining operation of the third embodiment according to the invention.

At processing 301, in synchronism with the signal of 1 Hz outputted by the time counting circuit 232, CPU 216 increments the value of the time counter on RAM 218 by +1 second. At processing 302, CPU 216 compares the value of the time counter counted at processing 301 with the alarm setting time stored in RAM 218, determines as coincidence of alarm when these are equal to each other and proceeds to processing 303. At processing 303, the opening and closing states of the strap 203 are detected by the strap detecting circuit 221. When the state of mounting the strap 203 on the wrist is detected, CPU 216 proceeds to processing 304 and carries out alarm informing by vibration. Conversely, when CPU 216 detects the state of detaching the strap 203 from the wrist, CPU 216 proceeds to processing 305 and carries out alarm informing by buzzer sound.

Further, although according to the embodiment, an explanation has been given of a method of switching the informing means when coincidence of alarm is informed to the user, for example, there may be used a method of switching informing means when a wireless circuit for carrying out wireless communication with outside is connected in place of the time counting circuit 232 in FIG. 11 and call from outside, reception of an arrived signal, or reception of data is informed to the user.

Figure 15:
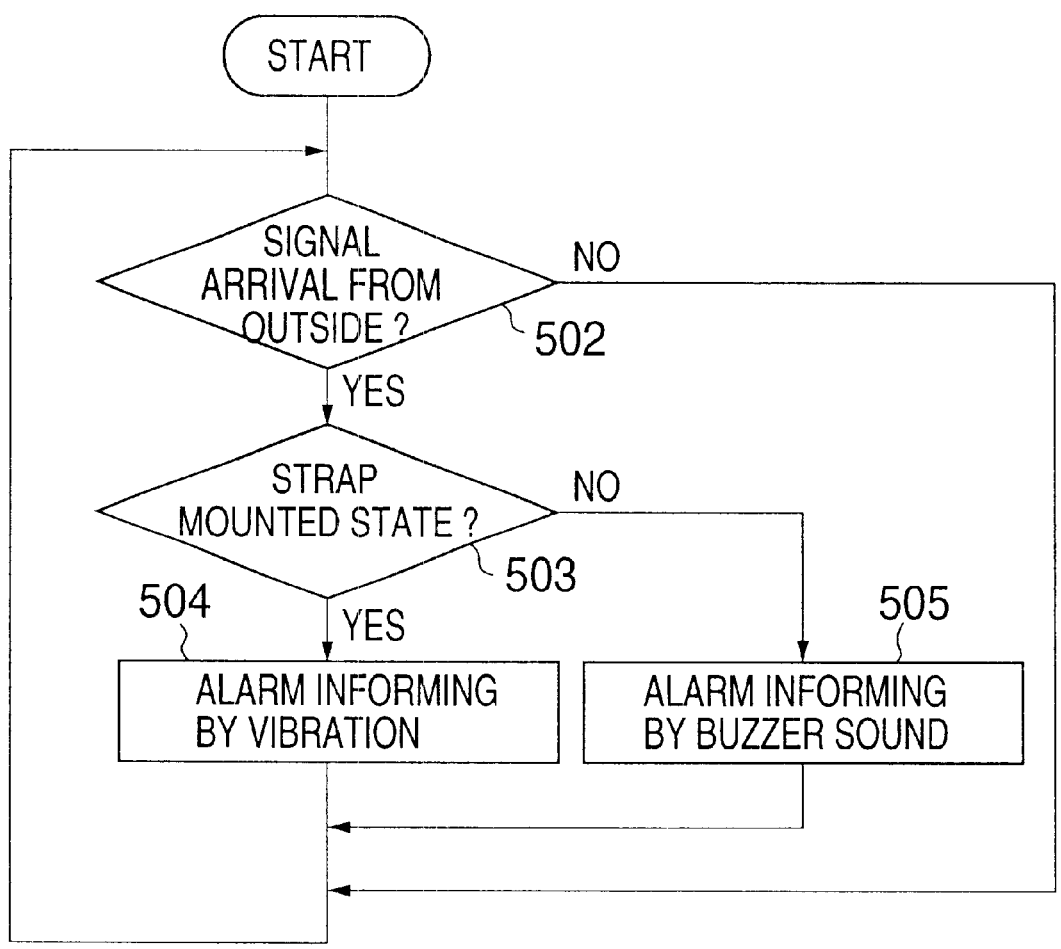
FIG. 15 is a flowchart diagram for explaining operation when data is received from outside in the wrist portable information apparatus of the third embodiment according to the invention.
Figure 16:
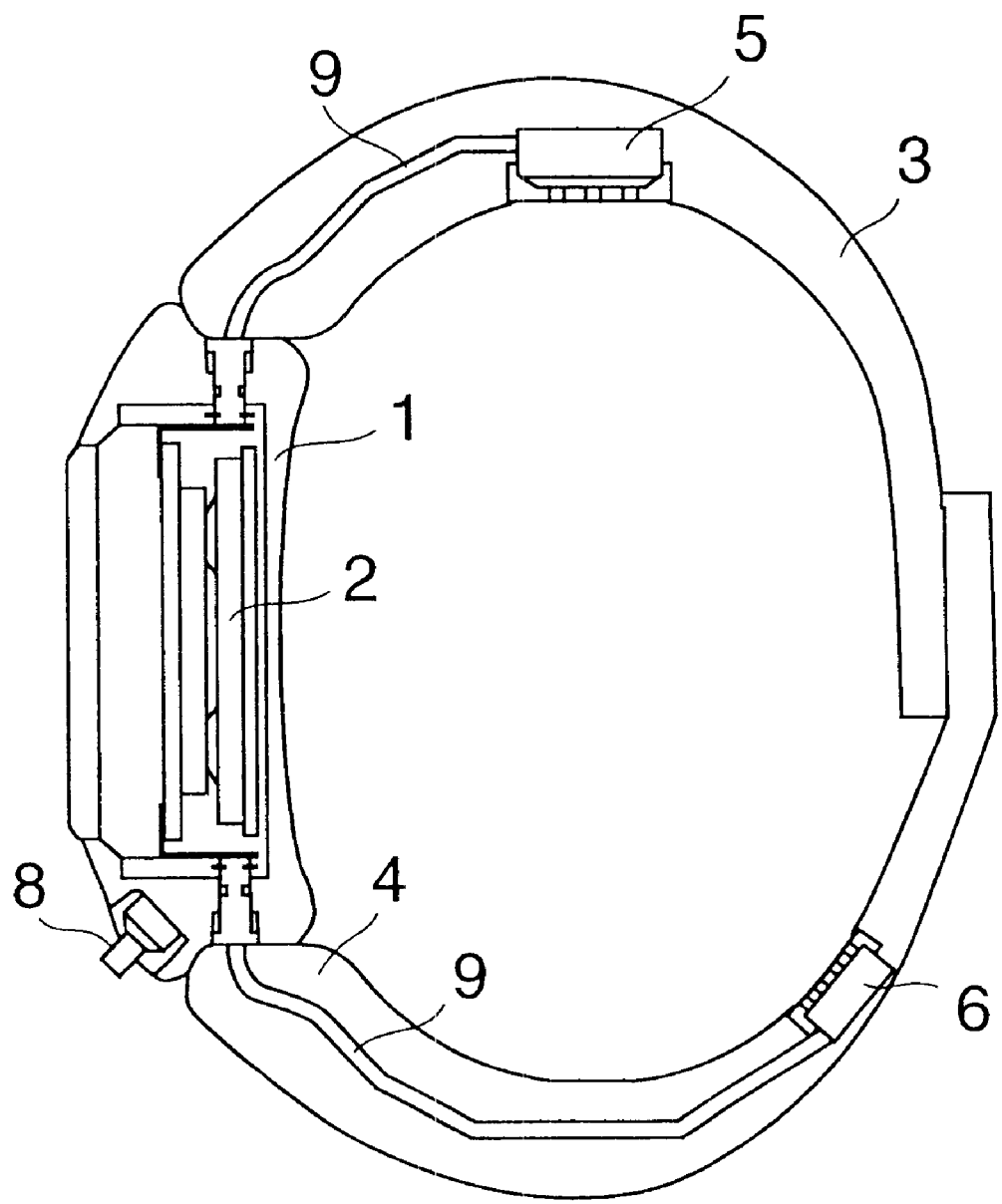
FIG. 16 is a perspective sectional view of a state in which a strap of a wrist watch type portable information apparatus is closed and attached to the wrist according to a first conventional example.
Figure 17:
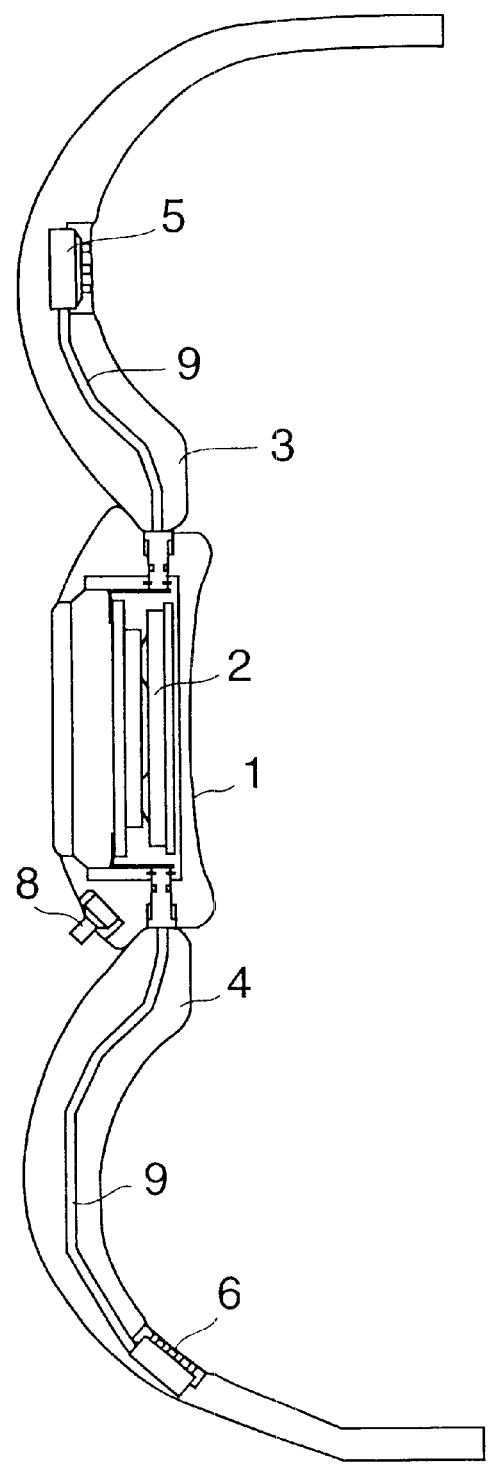
FIG. 17 is a perspective sectional view of a state in which the strap of the wrist portable information apparatus is opened and detached from the wrist according to the first conventional example.
Figure 18:
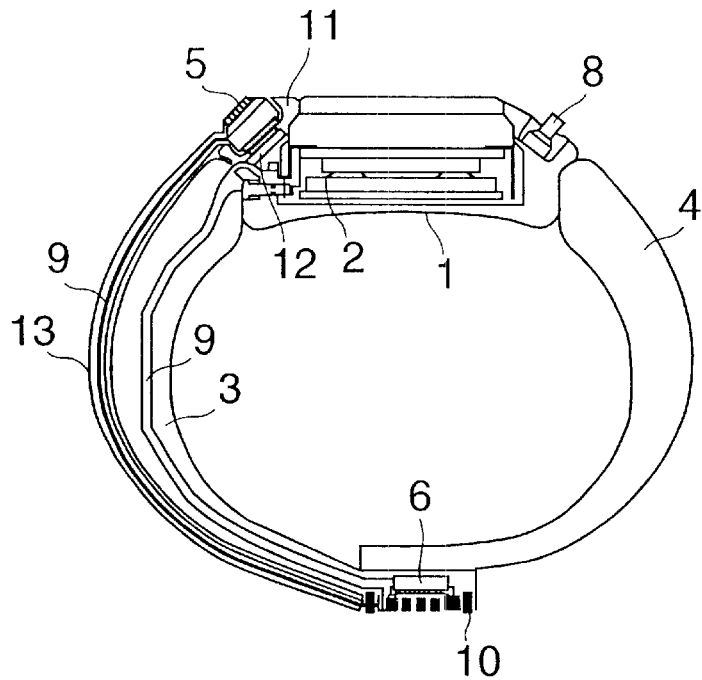
FIG. 18 is a perspective sectional view of a nonspeech state of wrist portable information apparatus according to a second conventional example.
Figure 19:
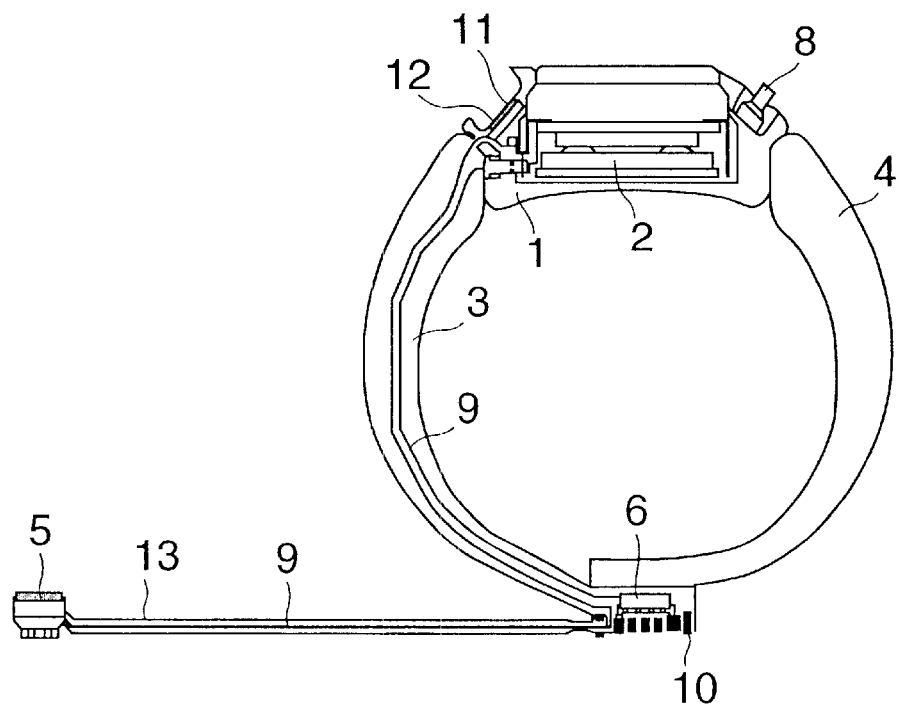
FIG. 19 is a perspective sectional view of a speech state of the wrist portable information apparatus according to the second conventional example.
Figure 20:
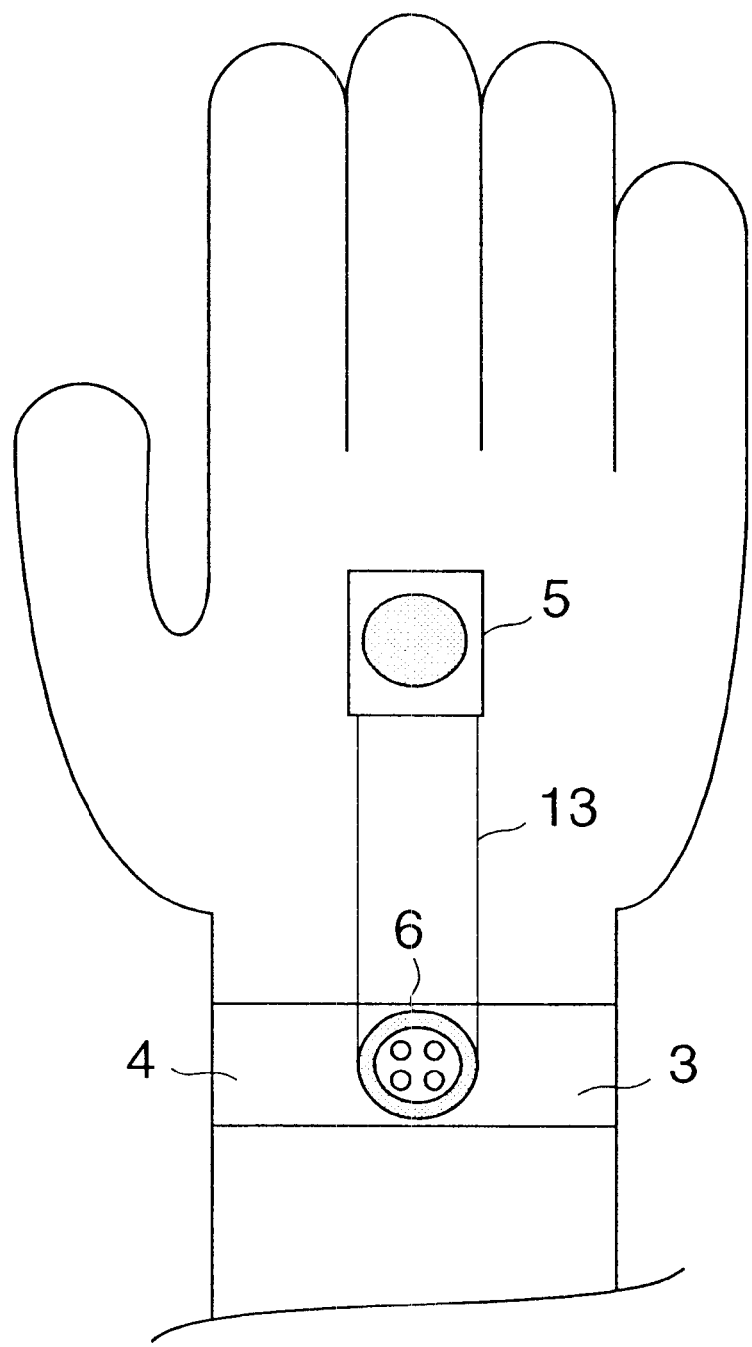
FIG. 20 is a schematic view with regard to a speech method using the wrist portable information apparatus according to the second conventional example.

FIG. 15 is a flowchart diagram for explaining operation when an arrived signal is received from outside according to the third embodiment of the invention. At processing 502, a wireless circuit monitors whether a signal arrives from outside and when the signal arrives, the operation proceeds to processing 503. At processing 503, the opening or closing state of the strap 203 is detected by the strap detecting circuit 221. When the state of mounting the strap 203 on the wrist is detected, the operation proceeds to processing 504 and alarm informing by vibration is carried out. Conversely, when the state of detaching the strap 203 from the wrist is detected, the operation proceeds to processing 505 and carries out alarm informing by buzzer sound. In the case of processing 502 of FIG. 15, the case can be replaced by a case of receiving all the outside signals using wireless communication such as signal arrival from outside as well as, for example, an arrived signal of a telephone, a received signal of an electronic mail and so on.

As described above, according to the wrist portable information apparatus of the invention, there is provided the means for detecting the opening and the closing state of the strap and therefore, in the state in which the wrist portable information apparatus according to the invention is mounted to the wrist, informing is more liable to be sensed and there is carried out informing by vibration which does not trouble surrounding persons. Further, in the state in which the wrist portable information apparatus according to the invention is detached from the wrist, there is a concern that informing by vibration cannot be detected and accordingly, informing by sound is carried out. For example, in the state in which a user goes out while normally wearing a timepiece, a user can be provided with informing by vibration which is more liable to be sensed and in the state in which the user detaches the timepiece after coming home, informing is carried out by sound and therefore, informing can be prevented from being heard.

Therefore, according to the wrist portable information apparatus of the invention, there can be provided the wrist portable information apparatus excellent in operability in which switch of setting informing means in accordance with a location or a scene can be carried out automatically without troublesome operation.

As described above, according to the invention, when there is an arrived signal by wireless, the invention can be shifted to a speech state immediately only by operation of opening the strap and accordingly, extra button operation is not needed and operability in speech can be promoted. Further, the style of the speech by the wrist portable information apparatus is similar to the style to which we are accustomed to and therefore, speech can be carried out without strange feeling. Further, in shifting to the speech state by opening the strap, during the time period from when the wrist portable information apparatus is put to the ear for speech until the user of the wrist portable information apparatus inputs a voice signal to a microphone for speech, there can be transmitted a message stating that the user of the wrist portable information apparatus is preparing to speech to a transmitting person and the message can arbitrarily be changed. Thereby, the user of the wrist portable information apparatus can correspond to the counter party carefully considerately by informing the situation of the user.

Further, the user can arbitrarily select to bring about a speech state immediately or transmit the message in accordance with the situation and therefore, there can be provided the speech style which is highly flexible in accordance with the situation.

Further, according to the wrist portable information apparatus of the invention, informing by vibration is carried out when the wrist portable information apparatus according to the invention is mounted to the wrist in the case of coincidence of alarm or in the case of arrival of telephone or reception of mail from outside. Thereby, influence of surrounding noise is made to be difficult to effect and even at a location in which the surrounding requests quite manner, informing can be carried out firmly without troubling surrounding persons.

Further, when the wrist portable information apparatus according to the invention is detached from the wrist and left, informing by sound is carried out. Thereby, when informing by vibration is inconvenient, informing by sound by auditory sense is carried out and informing can be transmitted more firmly.

Thereby, there can be provided the wrist portable information apparatus excellent in operability by automatically switching informing means and capable of transmitting informing more firmly.

What is claimed is:

1. A wrist portable information apparatus comprising:
   a main body case mounted to a user's wrist;
   a strap connected to the main body case for mounting the main body case to the user's wrist;
   a contact mechanism having an electrically connected state which is changed by opening and closing the strap;
   a detecting circuit for detecting opening and closing of the strap by detecting the connected state of the contact mechanism;
   a first alarm for producing a first alarm signal in response to a predetermined condition when an open state of the strap is detected by the detecting circuit; and
   a second alarm for producing a second alarm signal different from the first alarm signal in response to the predetermined condition when a closed state of the strap is detected by the detecting circuit.

2. The wrist portable information apparatus according to claim 1; further comprising a time counting circuit disposed in the main body case for counting time; and a memory circuit desposed in the main body case for storing set time information; wherein the first alarm signal or the second alarm signal is output when the set time information stored in the memory circuit and the time counted by the time counting circuit coincide with each other.

3. The wrist portable information apparatus according to claim 1; further comprising a wireless communication circuit disposed in the main body case for performing wireless communication; wherein the first alarm signal or the second alarm signal is output when data is received from outside via the wireless communication circuit.

4. The wrist portable information apparatus according to claim 1; further comprising a voice generating circuit disposed in the main body case for generating a voice generating circuit disposed in the main body case for generating a voice; and a vibration generating circuit disposed in the main body case for vibrating a vibration motor; wherein the first alarm signal is produced by the voice generating circuit and the second alarm signal is produced by the vibration generating circuit.

5. A wrist portable 3information apparatus according to claim 1; further comprising a voice generating circuit disposed in the main body case for generating a voice; and a vibration generating circuit disposed in the main body case for vibrating a vibration motor; wherein the first alarm signal comprises a sound and the second alarm signal comprises vibration.

6. A wrist portable information apparatus according to claim 1; further comprising a sound generating device disposed in the main body case for generating sound; and a vibration generating device disposed in the main body case for generating a vibration; wherein the first alarm signal is produced by the sound generating device and the second alarm signal is produced by the vibration generating device.

7. A wrist portable information apparatus comprising:
   a main body case containing a circuit board having a wireless communication circuit for performing wireless communication and a voice processing circuit for performing voice processing;
   a first strap portion connected to the main body case to mount the main body case to a user's wrist;
   a second strap portion connected to tile main body case at a position opposed to the first strap portion to mount the main body case to the user's wrist;
   a speaker contained in one of the main body case and the first strap portion to output processed voice from the voice processing circuit;
   a microphone contained in the main body case or the second strap portion to input voice to the voice processing circuit;
   a contact mechanism having an electrically connected state which is changed by opening and closing of at least one of the first strap portion and the second strap portion; and
   a detecting circuit for detecting opening and closing of the first strap portion or the second strap portion by detecting the connected state of the contact mechanism and outputting a signal for activating the voice processing circuit when an opened state of the contact mechanism is detected.

8. A wrist portable information apparatus according to claim 7; wherein the circuit board has a voice generating circuit for transmitting a message to a calling party using the wireless communication circuit when either of the first strap portion and the second strap portion is opened.

9. A wrist portable information apparatus according to claim 8; wherein the circuit board selects whether the message is to be transmitted by a state of opening either of the first strap portion and the second strap portion.

10. A wrist portable information apparatus according to claim 7; wherein the voice processing circuit converts digital data received by the wireless communication circuit into an analog signal for output to the speaker, and converts an analog signal input from the microphone into digital data and transmits the digital data to the wireless communication circuit.

11. A wrist portable information apparatus according to claim 7; wherein the detecting circuit places the speaker and the microphone in an inactive state when the apparatus is being worn on the user's wrist and places the speaker and microphone in an active state when the apparatus is removed from the user's wrist based upon the detected state of the contact mechanism.

12. A wrist portable information apparatus according to claim 7; wherein the speaker and microphone are maintained in an inactive state when the apparatus is removed from the user's wrist when an incoming signal received by the wireless communication circuit does not contain a voice signal.

13. A wrist portable information apparatus comprising:
a main body case having a circuit board having a wireless communication circuit for performing wireless communication and a voice processing circuit for performing voice processing;
a first strap portion having a speaker disposed therein for outputting processed voice signals from the voice processing circuit;
a second strap portion having a microphone disposed therein for inputting a user's voice to the voice processing circuit, the second strap portion being provided at a position opposed to the first strap portion;
a first contact mechanism having an electrically connected state which is changed by opening and closing of the first strap portion relative to the main body case;
a second contact mechanism having an electrically connected state which is changed by opening and closing of the second strap portion relative to the main body case; and
a detecting circuit for detecting opened and closed states of the first strap portion and the second strap portion by detecting connected states of the first contact mechanism and the second contact mechanism and outputting a signal for activating the voice processing circuit when an opened state of the first or second contact mechanisms is detected.

14. A wrist portable information apparatus according to claim 13; wherein the circuit board has a voice generating circuit for transmitting a message to a calling party using the wireless communication circuit when either of the first strap portion and the second strap portion is opened.

15. A wrist portable information apparatus according to claim 14; wherein the circuit board selects whether the message is to be transmitted by a state of opening either of the first strap portion and the second strap portion.

16. A wrist portable information apparatus according to claim 13; wherein the voice processing circuit converts digital data received by the wireless communication circuit into an analog signal for output to the speaker, and converts an analog signal input from the microphone into digital data and transmits the digital data to the wireless communication circuit.

17. A wrist portable information apparatus according to claim 13; wherein the detecting circuit places the speaker and the microphone in an inactive state when the apparatus is being worn on the user's wrist and places the speaker and microphone in an active state when the apparatus is removed from the user's wrist based upon the detected state of the contact mechanism.

18. A wrist portable information apparatus according to 13; wherein the speaker and microphone are maintained in the inactive state when the apparatus is removed from the user's wrist when an incoming signal received by the wireless communication circuit does not contain a voice signal.

19. A method of operating a wrist-wearable information apparatus having a wireless communication circuit disposed in a case, a strap for mounting the case on a user's wrist, and a contact mechanism provided on the strap and having an electrical state that chances depending upon the closed or opened state of the strap, the method comprising the steps of:
detecting an incoming wireless communication signal;
detecting that the strap is closed by detecting the electrical state of the contact mechanism;
informing a user of the incoming wireless communication signal;
detecting that the strap has been opened after informing the user of the incoming wireless communication signal by detecting that the electrical state of the contact mechanism has changed after the user has been informed of the incoming wireless communication signal; and
bringing the apparatus into a speech state by automatically activating a microphone and an earpiece connected to the wireless communication circuit after detecting that the strap has been opened and while the incoming wireless communication signal is being received.

20. A method according to claim 19; further comprising a nonspeech step of bringing the apparatus into a nonspeech state by deactivating the microphone and the earpiece when the strap is closed after having been opened.

21. A method according to claim 19; further comprising a message transmitting step of transmitting a predetermined message to a calling party until a voice is inputted into the microphone in the speech state.

22. A method according to claim 21; further comprising a message selecting step in which the user selects the message to be transmitted in the message transmitting step.

23. A method according to claim 19; further comprising a selecting step of selecting whether the message transmitting step is to be carried out.

24. A method according to claim 23; further comprising a message selecting step in which the user selects the message to be transmitted in the message transmitting step.

25. A wearable information apparatus comprising: a case; a strap attached to the case for mounting the case to a user's body; a wireless communication circuit for performing wireless communication; a contact mechanism having an electrical state which changes depending upon the opened or closed state of the strap; a detecting circuit for detecting the electrical state of the contact mechanism and outputting a detection signal; a control circuit for detecting incoming signals from the wireless communication circuit and generating an output signal when the control circuit receives the incoming signal from the wireless communication circuit, the output signal having a value which depends upon the detection signal; and a signal generating circuit for detecting the output signal of the control signal and generating an audible alarm signal or a vibratory alarm signal depending upon the value of the output signal.

26. A wearable information apparatus according to claim 25; wherein the strap comprises a wrist strap.

27. A wearable information apparatus according to claim 25; further comprising a time counting circuit disposed in the case for counting time.

28. A wearable information apparatus according to claim 25; wherein the wireless communication circuit disposed in the case; a voice processing circuit disposed in the case; and a microphone and a speaker disposed in one of the case or the strap.

29. A wearable information apparatus according to claim 28; wherein the voice processing circuit converts digital data received by the wireless communication circuit into an analog signal for output to the speaker, and converts an analog signal input from the microphone into digital data and transmits the digital data to the wireless communication circuit.

30. A wearable information apparatus according to claim 28; wherein the detecting circuit places the speaker and the microphone in an inactive state when the apparatus is being worn on the user's wrist and places the speaker and microphone in an active state when the apparatus is removed from the user's wrist based upon the detected state of the contact mechanism.

* * * * *